United States Patent Office 3,371,501
Patented Mar. 5, 1968

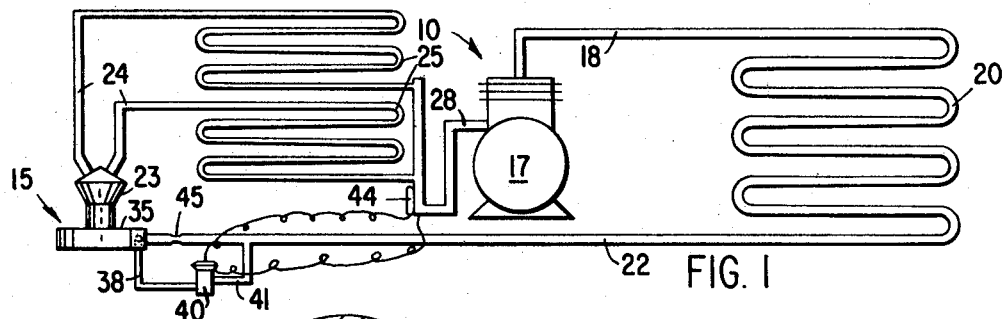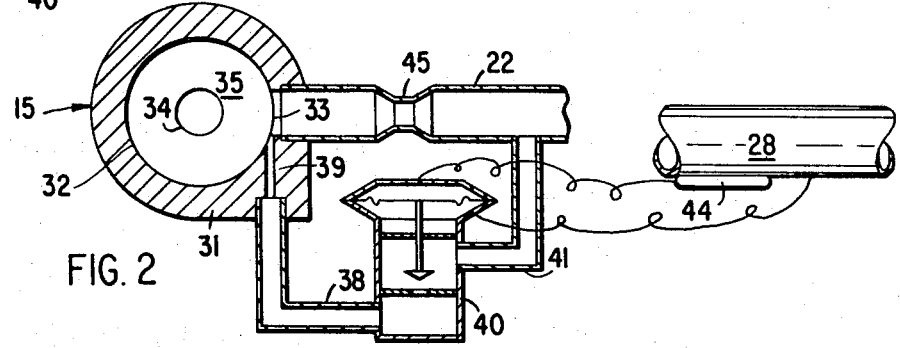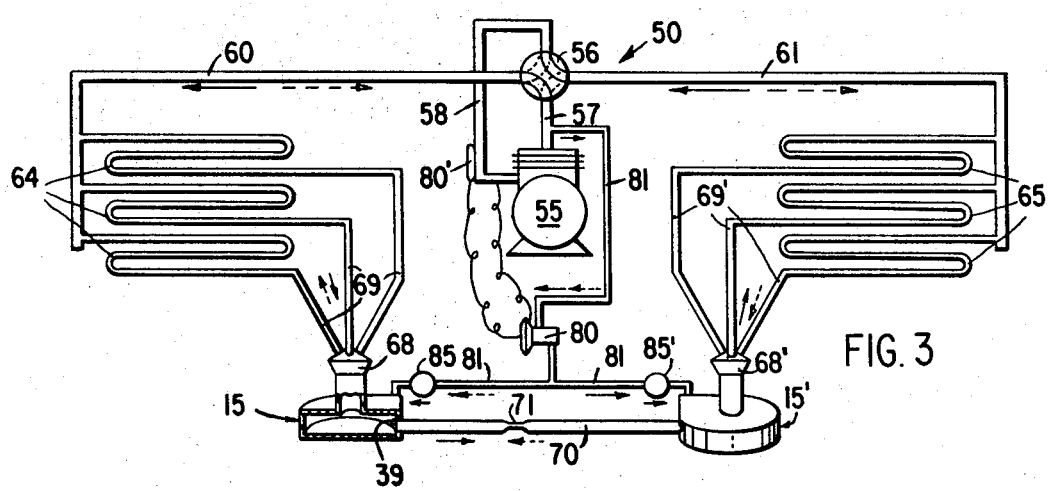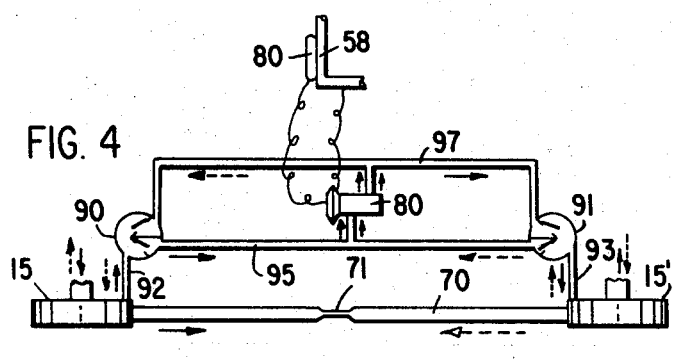

3,371,501
REFRIGERANT SYSTEM EXPANSION MEANS
Hal H. Rhea, North Syracuse, and David S. Wilson, East Syracuse, N.Y., assignors to Carrier Corporation, Syracuse, N.Y., a corporation of Delaware
Filed June 20, 1966, Ser. No. 558,710
8 Claims. (Cl. 62—160)

This invention relates to refrigeration systems and, more particularly, to an improved expansion means for refrigeration systems.

Refrigeration systems employ, as a means for expanding the relatively high pressure liquid refrigerant leaving the system condenser, either a fixed restrictor, commonly known as a capillary tube, or a variable restrictor, such as a thermal expansion valve. While fixed restrictors are relatively inexpensive, their lack of adaptability to change in system load limits their usefulness. On the other hand, the variable restrictor, such as a thermal expansion valve, incorporates a controlling mechanism for varying the valve setting in response to changes in system load. However, variable restrictors are relatively expensive, particularly where the capacity requirement is relatively large.

It is a principal object of the present invention to provide a new and improved refrigeration system.

It is a further object of the present invention to provide an improved refrigeration system where a vortex type fluid regulator functions as the system expansion device.

It is an object of the present invention to provide a refrigeration system in which a fluid regulator is used to feed controlled amounts of refrigerant to the system evaporator in response to system load.

It is a further object of the present invention to provide, in a refrigeration system, a fluid regulator with a pilot duty thermal expansion valve control as refrigerant expansion means.

This invention relates to a refrigeration system comprising, in combination, compression means; a first heat exchanger for receiving refrigerant discharged by the compression means; refrigerant metering means connected with the first heat exchanger; and a second heat exchanger arranged between the refrigerant metering means and the compression means, the system being adapted upon actuation of the compression means to cool; the refrigerant metering means including a fluid regulator forming a vortex chamber through which refrigerant passes enroute to the second heat exchanger, the regulator having a control orifice in substantially tangential communication with the vortex chamber for introduction of vortex inducing pressurized control fluid into the regulator chamber, and control means for varying discharge of pressurized control fluid from the regulator orifice in response to system cooling load conditions to vary flow of refrigerant through the regulator to the second heat exchanger in accordance with changes in system cooling load.

Other objects of the invention will be apparent from the ensuing description and drawings in which:

FIGURE 1 is a schematic view of a refrigeration system incorporating a vortex type fluid regulator expansion means;

FIGURE 2 is an enlarged view of the fluid regulator of FIGURE 1;

FIGURE 3 is a schematic view of a reverse cycle refrigeration system incorporating a pair of fluid regulators as refrigerant expansion means; and FIGURE 4 is a schematic view showing a modified control arrangement for the regulators of the FIGURE 3 system.

Referring to FIGURE 1 of the drawings, there is shown a refrigeration system 10 incorporating a vortex fluid regulator or amplifier 15 as the system refrigerant expansion device. Refrigeration system 10 has a suitable refrigerant compressor 17 which, while illustrated as a reciprocating compressor, may comprise any suitable compressor such as rotary, centrifugal, etc. Refrigerant line 18 conducts the relatively high pressure gaseous refrigerant discharged from compressor 17 to system condenser 20. Refrigerant from condenser 20 passes through line 22 to the system expansion or metering means, fluid regulator 15.

Reduced pressure refrigerant is fed by regulator 15 through distributor 23 and feeder lines 24 to system evaporator 25. The thermal interchange effected by evaporator 25 between the refrigerant and the medium being cooled, for example air, vaporizes or evaporates refrigerant in evaporator 25 while extracting heat from the medium being cooled. A suitable circulating means such as a fan (not shown) may be provided for bringing the medium being cooled into heat exchange relation with evaporator 25. Vaporized refrigerant leaving evaporator 25 returns through line 28 to the inlet or suction side of compressor 17.

As seen in FIGURES 1 and 2, fluid regulator 15 comprises a shell 31 forming a generally cylindrical vortex chamber 32. Refrigerant line 22, which connects to inlet 33 in the peripheral wall of shell 31, discharges, during system operation, a stream of liquid refrigerant into vortex chamber 32. Outlet 34 in end wall 35 of regulator 15 communicates with distributor 23. As is manifest, refrigerant entering vortex chamber 32 of regulator 15 undergoes an approximate 90° change in direction for discharge through outlet 34 into distributor 23.

Control line 38, which connects with a source of pressurized control fluid, communicates with control orifice 39 opening tangentially into vortex chamber 32. A suitable control device, such as thermal powered control valve 40, controls the flow of pressurized control fluid to orifice 39 and regulator 15. Line 41 connects control valve 40 with a source of pressurized control fluid which may comprise system liquid line 22. Alternately, pressurized control fluid may be withdrawn from discharge gas line 18.

Feeler bulb 44 of control valve 40 is arranged to respond to system load conditions. Bulb 44 is preferably fastened to system suction line 28. Refrigerant line 22 includes restriction 45 downstream of line 41, which serves to establish the requisite operating pressure differential across control valve 40.

The discharge of a relatively small stream of pressurized control fluid tangentially from control orifice 39 into vortex chamber 32 of fluid regulator 15 causes the stream of refrigerant flowing through chamber 32 to follow a vortex-like path which reduces the flow of refrigerant through regulator 15. The reduction in refrigerant flow through regulator 15 is proportional to the discharge of pressurized control fluid into vortex chamber 32 of regulator 15. Control valve 40 varies the flow of pressurized control fluid to control orifice 39 of regulator 15 in response to system load conditions to vary the vortex effect created in chamber 32 of regulator 15 and hence the feed of refrigerant to evaporator 25 in response to changes in system load.

Referring to FIGURE 3, there is shown a reverse cycle refrigeration system 50, commonly known as a heat pump, incorporating, as the refrigerant expansion means, paired fluid regulators 15, 15′. Refrigeration system 50 includes a reversing valve 56 joined by lines 57, 58 to the discharge and suction sides of compressor 55. Refrigerant lines 60, 61 join valve 56 with outdoor and indoor heat exchanger coils 64, 65 respectively.

The outlets of fluid regulators 15, 15′ are preferably joined to coils 64, 65 by distributors 68, 68′ and multiple feed lines 69, 69′. Refrigerant line 70, having a restricted portion 71, interconnects regulators 15, 15′.

With reversing valve 56 in the solid line position shown, during operation of compressor 55, gaseous refrigerant from compressor 55 passes through line 57 and valve 56 into line 60 and outdoor coil 64, acting as a condenser. Condensed refrigerant from coil 64 passes through feeder lines 69, distributor 68, regulator 15 and line 70 to regulator 15′ where the refrigerant is expanded. Reduced pressure refrigerant from regulator 15′ flows through distributor 68′ and feed lines 69′ to indoor coil 65, now functioning as an evaporator. The heat interchange effected by coil 65 with the medium being conditioned, for example air, cools the medium while vaporizing refrigerant in coil 65. Vaporized refrigerant from coil 65 returns through line 61, valve 56 and line 58 to compressor 55 to complete the cycle. A suitable fan (not shown) may be provided to bring medium to be conditioned into heat exchange relation with coil 65.

Reversing valve 56, when moved to the dotted line position, routes gaseous refrigerant from compressor 55 through line 61 to indoor coil 65, now acting as a condenser. There, heat extracted from the refrigerant by the medium being conditioned warms the medium while condensing the refrigerant. Condensed refrigerant from coil 65 passes through feeder lines 69′, distributor 68′, regulator 15′ and line 70 to regulator 15 where the refrigerant is expanded. Reduced pressure refrigerant from regulator 15 passes through distributor 68 and feeder lines 69 into outdoor coil 64, acting as an evaporator. There the refrigerant is vaporized, the vaporous refrigerant returning to compressor 55 through line 60, reversing valve 56 and line 58 to complete the cycle.

In order to control flow of refrigerant through regulators 15, 15′ each regulator is connected through control valve 80 and control line 81 with a suitable source of pressurized control fluid from system discharge line 57. Control line 81 connects to orifices 39 of regulators 15, 15′. Control valve 80, which may comprise a pilot duty thermal expansion valve, includes a suitable temperature responsive element, feeler bulb 80′, suitably arranged to sense system load conditions. Bulb 80′ may, for example, be fastened to compressor suction line 58.

Check valves 85, 85′ prevent reverse flow of refrigerant from regulators 15, 15′ through control line 81 to valve 80. During operation of the system on the cooling cycle, control valve 80 regulates discharge of pressurized control fluid through the control orifice of fluid regulator 15′ in response to system cooling load conditions to control flow of refrigerant to indoor coil 65. Flow of pressurized control fluid to regulator 15 is prevented since pressures in regulator 15 are greater than pressures in control line 81. Check valve 85 prevents reverse flow of refrigerant from regulator 15 through control line 81.

During the heating cycle, control valve 80 regulates discharge of pressurized control fluid through the control orifice of fluid regulator 15 to control flow of refrigerant to outdoor coil 64 in response to system heating load conditions. Check valve 85′ prevents reverse flow of refrigerant from regulator 15′ through control line 81. The pressure differential established by restricted portion 71 of line 70 assures closure of check valves 85, 85′ to prevent reverse flow of refrigerant through control line 81.

In the embodiment shown in FIGURE 4, the system liquid line upstream of flow regulators 15, 15′ is used as the source of pressurized control fluid. In that arrangement, double acting check valves 90, 91 are arranged between control lines 92, 93 to regulators 15, 15′ respectively and pressure inlet line 95 of control valve 80. Line 97 joins the outlet of control valve 80 to check valves 90, 91 and control lines 92, 93 respectively.

During the cooling cycle, pressurized control fluid from regulator 15 passes through control line 92 and check valve 90 to inlet line 95 and control valve 80. From control valve 80 an amount of pressurized control fluid commensurate with system load conditions passes through line 97, check valve 91 and control line 93 to fluid regulator 15′. During the heating cycle, pressurized control fluid from regulator 15′ passes through control line 93 and check valve 91 to inlet line 95 and control valve 80. From control valve 80 an amount of pressurized control fluid commensurate with the system heating load flows through line 97 and check valve 90 to control line 92 and fluid regulator 15.

While we have described a preferred embodiment of our invention, it will be understood that our invention is not limited thereto but may be otherwise embodied within the scope of the following claims.

We claim:

1. In a refrigeration system, the combination of compression means; a first heat exchanger for receiving refrigerant discharged by said compression means; refrigerant metering means connected with said first heat exchanger; and a second heat exchanger arranged between said refrigerant metering means and said compression means, said system being adapted upon actuation of said compression means to cool, said refrigerant metering means including a fluid regulator forming a vortex chamber through which refrigerant passes enroute to said second heat exchanger, said regulator having a control orifice in substantially tangential communication with said vortex chamber for introduction of vortex inducing pressurized control fluid into said regulator chamber, and control means for varying discharge of pressurized control fluid from said regulator orifice in response to system cooling load conditions to vary flow of refrigerant through said regulator to said second heat exchanger in accordance with changes in system cooling load.

2. A refrigeration system according to claim 1 in which said pressurized control fluid comprises refrigerant from said system.

3. A refrigeration system according to claim 1 in which said control means includes a valve for regulating flow of said pressurized control fluid to said regulator.

4. A refrigeration system according to claim 3 in which said valve comprises a thermal expansion valve.

5. A refrigeration system according to claim 3 including a pressure reducing device between said first heat exchanger and said fluid regulator, an inlet line connecting said valve with said refrigerant system upstream of said pressure reducing device, and an outlet line connecting said valve with said regulator control orifice.

6. A refrigeration system according to claim 1 including valve means effective when actuated to reverse flow of refrigerant from said compression means through said second heat exchanger, said refrigerant metering means, and said first heat exchanger whereby said system, upon actuation of said compression means, heats; said refrigerant metering means including a second fluid regulator through which refrigerant from said second heat exchanger and flowing reversely through the first regulator vortex chamber passes enroute to said first heat exchanger, said control means varying discharge of pressurized control fluid from the control orifice of said second regulator in response to system heating load conditions to vary flow of refrigerant through said second regulator to said first heat exchanger in accordance with changes in system heating load.

7. A refrigeration system according to claim 6 in which said control means includes a valve; an outlet line for feeding pressurized control fluid from said valve to the control orifice of each of said first and second regulators; and one way valve means for preventing reverse fluid flow through said outlet line to said valve.

8. A refrigeration system according to claim 7 including an inlet line for admitting pressurized control fluid to said valve, said one way valve means being adapted to communicate said inlet line with the vortex chamber of one of said first and second regulators while connecting said outlet line with the vortex chamber of the other of said first and second regulators.

References Cited

UNITED STATES PATENTS

| | | | |
|---|---|---|---|
| 2,063,380 | 12/1936 | Hoesel | 62—525 |
| 2,084,755 | 6/1937 | Young | 62—525 XR |
| 3,110,162 | 11/1963 | Gerties | 62—196 |

MEYER PERLIN, *Primary Examiner.*